United States Patent [19]

Dinh et al.

[11] Patent Number: 4,562,470
[45] Date of Patent: Dec. 31, 1985

[54] ELECTRICAL NOISE REDUCER FOR T.V. SIGNALS

[75] Inventors: Chom T. L. Dinh, Brossard; Roger Garceau, Pierrefonds; Marc Pastor, St-Hubert; Gerard Terreault, Pointe-Claire, all of Canada

[73] Assignee: Centre de Recherche Industrielle du Quebec, Quebec, Canada

[21] Appl. No.: 482,870

[22] Filed: Apr. 7, 1983

[51] Int. Cl.[4] .............................................. H04N 5/21
[52] U.S. Cl. ...................................... 358/167; 358/36
[58] Field of Search ................. 358/167, 36, 336, 340, 358/905

[56] References Cited

U.S. PATENT DOCUMENTS 4,152,657 5/1979 Robers ................................ 358/167

4,361,853 11/1982 Remy ................................... 358/167

Primary Examiner—Tommy P. Chin
Attorney, Agent, or Firm—Oblon, Fisher, Spivak, McClelland & Maier

[57] ABSTRACT

A digital system for removing, from a television signal, the electrical noise generated by faulty isolators from power lines. A thin horizontal segment noise detector locates possible noisy pixels (picture elements), and an image horizontal line verifier prevents false alarms given by the noise detector. An image corrector is provided to remove detected noise. The real time algorithm described in the invention is designed to provide a robust detector pseudo independent of noise waveforms, a memory window of three video delay lines, and a low cost digital hardware system.

15 Claims, 6 Drawing Figures

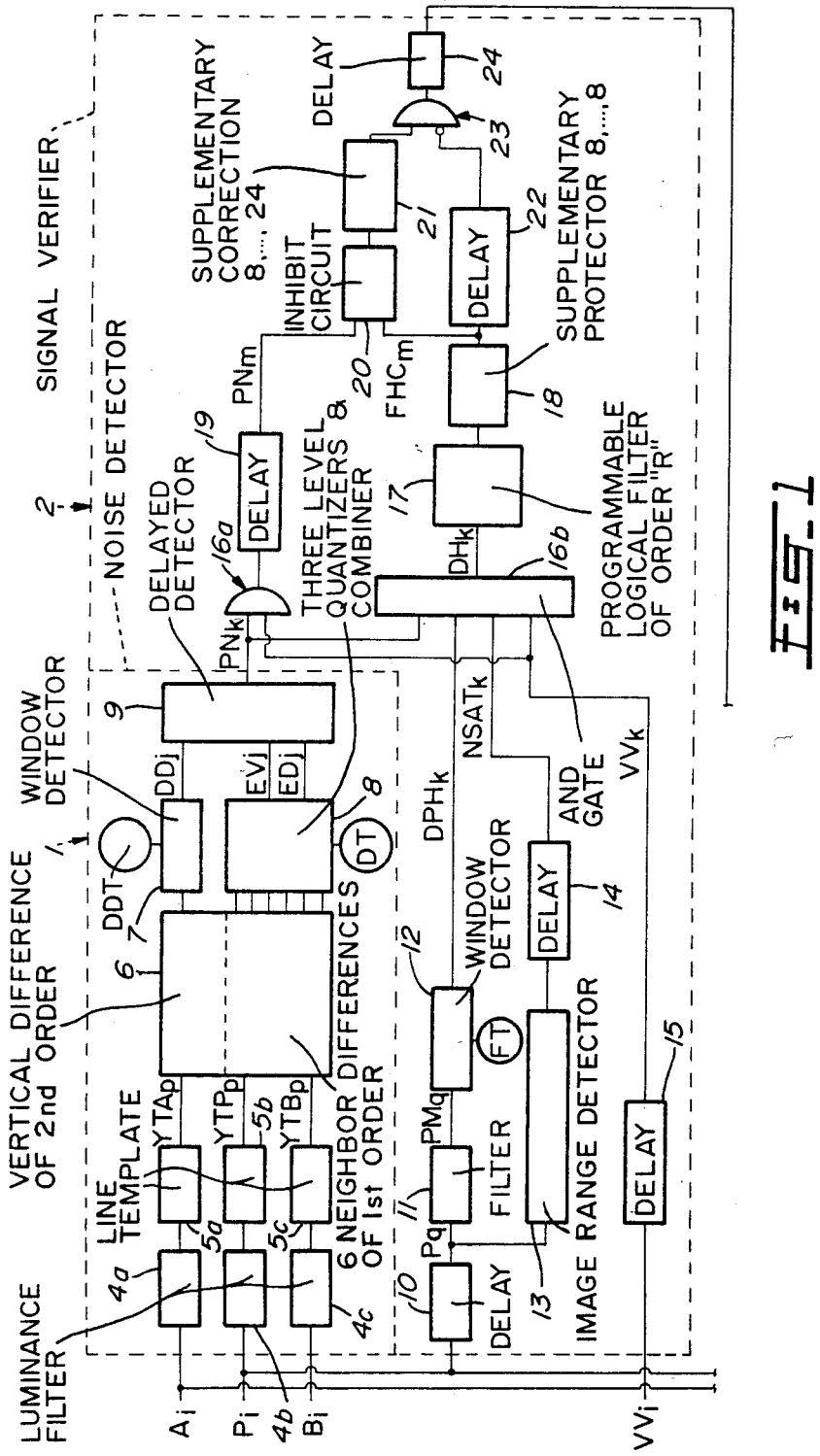

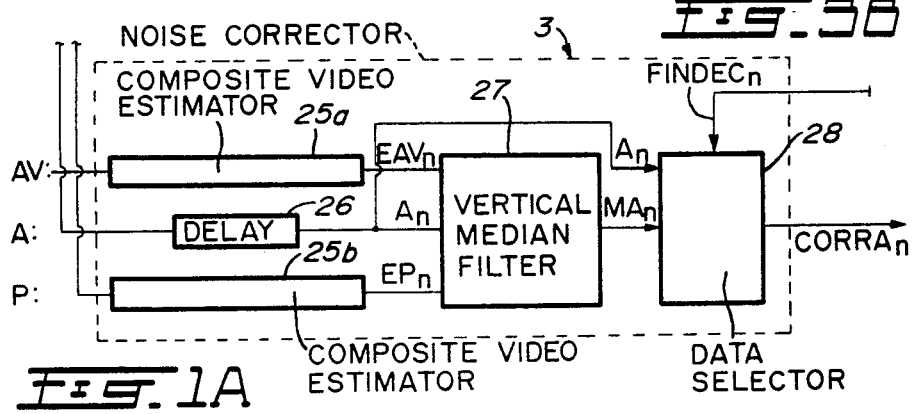

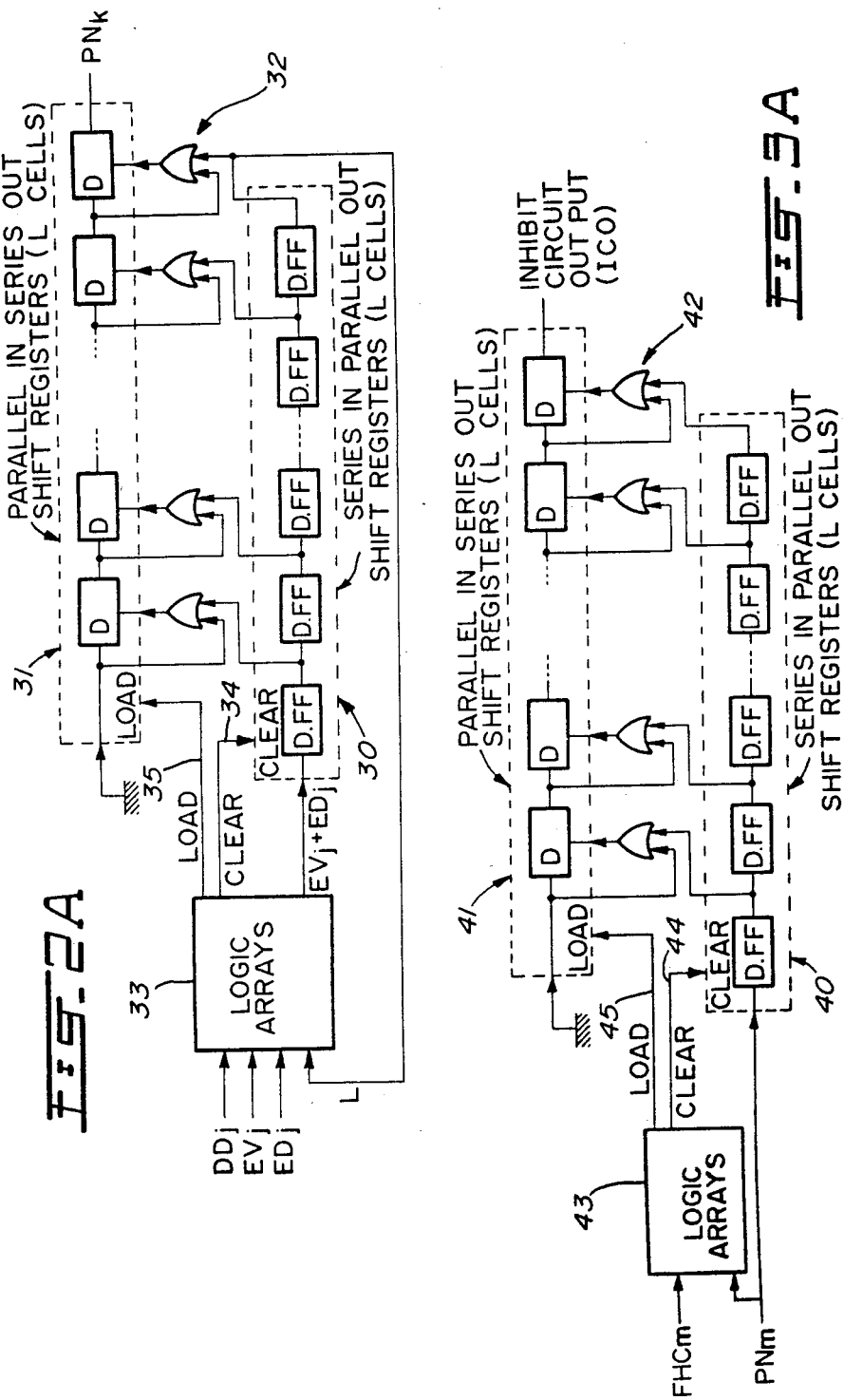

ELECTRICAL NOISE REDUCER FOR T.V. SIGNALS

BACKGROUND OF THE INVENTION (a) Field of the Invention

The present invention relates to a noise canceller system which removes noise in a television signal and particularly to an image processing system for removing electrical noise disturbance in television signals caused by electromagnetic waves generated by power lines.

(b) Description of Prior Art

In recent years, various devices and systems have been proposed for real time cancelling or reducing noise in a television signal. U.S. Pat. Nos. 4,064,530 and 4,072,984 teach the use of a first order digital filter with a frame delay and a movement detector. A known multiprocessor also teaches the use of the Hadamard transform of frame difference signal for extracting noise. These two known systems, however, require a frame memory, the cost of which is very expensive. Furthermore, the algorithms implemented in these systems, designed for reducing independent white noise are not truly effective for electrical noise which is simply not of the same nature. Faulty isolators on power lines generate sparks of very short duration (a few nanoseconds) radiating electromagnetic waves that are captured by the television signal receiving antenna. The short pulse creates a large disturbance in the receiver that approximates a damped oscillation of a few microseconds duration (the impulse response of the channel). When it is related to the power line frequency of 120 Hz, it produces two bands of thin horizontal speckles drifting across the television screen.

In image processing it is known to use many line masks for detecting those noise speckles. However, in a genuine signal, thin horizontal lines, for example, contour enchancement of alphanumeric characters, are also falsely detected.

In the present invention, a non-linear filter with delayed decision is used as the noise detector. A new signal line detector is also used to inhibit correction of the point erroneously identified as noisy. The signal line detector is simple and effective.

SUMMARY OF INVENTION

A feature of the invention is to provide a digital device which is capable of cancelling electrical noise in a television signal.

Another feature of this invention is to provide an effective noise filter which gives a minimal degradation on the genuine signal.

A further feature of this invention is to provide a robust noise detector which is independent of the noise waveform.

Still another feature of the invention is to provide a relatively simple and inexpensive device where the algorithm requires only three video delay lines and standard fast integrated circuits.

According to the above features, from a broad aspect, the present invention provides an electrical noise canceller system for television signals. The system comprises a noise detector circuit having three digital video delay line inputs representative of three video horizontal lines. The detector provides a binary output signal indicative of the luminance calculation of the pixel difference between the three inputs to determine if a selected one of the lines is noisy or not. A signal verifier circuit is connected to the binary output signal to verify same and provide an output signal to indicate if a noise correction is required on the selected one of the lines. A noise corrector circuit is governed by the output signal of the signal verifier circuit to effect a substitution of a noisy line by a line which is in a non-linear estimate of its immediate neighbouring vertical video lines.

BRIEF DESCRIPTION OF DRAWINGS

A preferred embodiment of the present invention will now be described with reference to an example thereof illustrated in the accompanying drawings in which:

FIGS. 1 and 1a is a block diagram of the electrical noise reducer of the present invention;

FIG. 2a is a block diagram of the delayed detector circuit;

FIG. 2b is a diagram illustrating the functioning of the delayed detector of FIG. 2;

FIG. 3a is a block diagram of the inhibit circuit, and

FIG. 3b is a diagram illustrating the functioning of the inhibit circuit of FIG. 3.

DESCRIPTION OF PREFERRED EMBODIMENTS

The electrical noise reducer of the present invention is a digital image processor functioning in real time at 14.318 MHz sampling rate (four times the colour subcarrier frequency).

Referring to the drawings, FIGS. 1 and 1a illustrates the proposed configuration of the electrical noise reducer. This system includes a noise detector 1, a signal verifier 2, and a noise corrector 3.

The four digital video inputs, from a three delay line memory, have been designated by $P_i$ representing a line delay version of $B_i$, $A_i$ is a line delay version of $P_i$, and $AV_i$ is a line delay version of $A_i$.

Let $P_i$, the point to be considered (noisy or not) at a time i. The input $P_i$ and its two vertical neighbours $A_i$ and $B_i$ are fed to the noise detector 1. Precisely, these three inputs $A_i$, $P_i$, $B_i$ are sent individually to their respective luminance filters 4a, 4b and 4c. Each of these filters realizes the following transfer function:

$$\text{Luminance filter: } \tfrac{1}{2}[1+\tfrac{1}{2}(z^2+z^{-2})] \tag{1}$$

where $z^{-1}$ is the well known pixel delay operator, $z^2$ is a double advance operator, and $z^{-2}$ is a double delay operator. The above transfer function is probably the simplest linear phase transversal filter for luminance calculation. The luminance filter outputs are fed individually to their respective line template circuit 5a, 5b and 5c which is described by:

$$\text{Line template: } \tfrac{1}{2}[1+\tfrac{1}{2}(z+z^{-1})] \tag{2}$$

where z is a single advance operator. This line template is used for hardware simplification. However, the most effective link mask should be $(\tfrac{1}{3})[1+z+z^{-1}]$.

The line template outputs are fed to a difference calculator circuit 6 which gives, in turn, seven outputs. The second order vertical difference:

$$YTP_p - \tfrac{1}{2}(YTA_p + YTB_p) \tag{3}$$

is sent to a window detector 7, in which a threshold signal DDT (double difference threshold) is applied.

The window detector output, $DD_j$, is a binary signal defined as follows:

$$DD_j = \begin{cases} 1 \text{ if } |YTP_j - \frac{1}{2}(YTA_j + YTB_j)| > DDT \\ 0 \text{ elsewhere.} \end{cases} \quad (4)$$

The six other outputs of the difference calculator circuit 6 are the six first order differences between the value $YTP_p$ of the point $P_p$ and those of its vertical diagonal neighbours. Explicitely they are:

$$YTP_p \text{ (the output of equation (2))} - YTA_{p-1}, \quad (5)$$

$$YTP_p - YTA_p, \; YTP_p - YTA_{p+1}$$

$$YTP_p - YTB_{p-1}, \; YTP_p - YTB_p, \; YTP_p - YTB_{p+1}$$

Each of the six first order difference is quantized to three discrete levels by a difference threshold (DT). The results are:

$$DYTA_{p+q} = \begin{cases} 1 \text{ if } YTP_p - YTA_{p+q} > DT \\ 0 \text{ if } |YTP_p - YTA_{p+q}| \leq DT \\ -1 \text{ if } YTP_p - YTA_{p+q} < -DT \end{cases} \quad (6a)$$

$$DYTB_{p+q} = \begin{cases} 1 \text{ if } YTP_p - YTB_{p+q} > DT \\ 0 \text{ if } |YTP_p - YTB_{p+q}| \leq DT \\ -1 \text{ if } YTP_p - YTB_{p+q} < -DT \end{cases} \quad (6b)$$

in which $q = -1, 0, 1$.

The combiner function in the circuit 8 is used to reduce the six quantized differences to two binary signals $EV_j$, $ED_j$ by the following manner:

$$EV_j = \begin{cases} 1 \text{ if } DYTA_j \cdot DYTB_j = 1 \\ 0 \text{ otherwise} \end{cases} \quad (7)$$

$$E_{j+q} = \begin{cases} 1 \text{ of } DYTA_{j+q} \cdot DYTB_{j+q} = 1 \\ 0 \text{ otherwise} \end{cases} \quad (8a)$$

and $$ED_j = E_{j+1} \cdot E_{j-1} \quad (8b)$$

in which now $q = -1, 1$.

Mathematical expressions describing the three level quantizers and the combiner 8 are lengthy. Fortunately, the hardware implementation is simple: three comparators and some logical gates (not shown).

The three binary parameters, $DD_j$, $EV_j$, $ED_j$ of the pixel $P_j$ are fed simultaneously to a delayed detector 9 of a maximum length L. The detector binary output $PN_k$, if it equals to 1 at the time k, indicates that the pixel $P_k$ is a possible noisy one. The functioning mechanism of the delayed detector is described as follows:

Consider a window defined by the consecutive 1 of the sequence EV+ED.

If the window length (1's number) is less than L, if the 1 in the sequences EV and ED coincide one by one, and if within the window the sequence DD gives at least one 1, then, at the end of the window (transition 10), the possible noise sequence PN is decided to be a replica of the sequence EV or ED. If not, the sequence PN which equals to 0 outside the window is set to be equal also to 0 (no noise) inside the window.

FIG. 2 illustrates the above statement and a possible hardware realisation of the delayed detector using mainly a series in-parallel out shift register circuit 30, and a parallel in-series out shift register circuit 31.

Referring now again to FIG. 1, the noise detector 1 algorithm is based on two points. Firstly, due to the electrical noise nature, it is reasonable to calculate the luminance in the horizontal direction and to make decision on the vertical and diagonal direction of the same lines. Secondly, since electrical noise results in thin horizontal lines, detector algorithms have to extract only this feature. The proposed one approximates, in a quantitative manner, the fact that the noisy pixel is darker or brighter than each of its vertical or diagonal neighbours.

Experience has shown that the result output PN is not sensible to the double difference threshold in the window detector 7. A fixed value of about 13 IRE units will yield good result. However, the detector output PN is more sensible to the difference threshold values of circuit 8; a range from 6 to 12 IRE units is desirable. The maximum length L, in the detector circuit 9, is only a physical implementation constraint, values from 40 to 80 pixels are adequate for electrical noise from power lines.

Referring to FIG. 1, the signal verifier circuit 2 is provided to inhibit false detection. The fundamental circuits in this circuit are the filter 11, flatness window detector 12, logical filter 17 and inhibit circuit 20. The delay circuits 10, 14, 15, 19, 22 and 24 are used for causality purpose, i.e. compatible timing.

In a genuine signal, thin horizontal lines, for example, contour enhancement of alphanumeric characters are usually flat or constant in opposition to a damped oscillation of noise waveform. Moreover, the duration of signal horizontal segments is at least five pixels. These observations allow an effective manner for separating signal from noise.

Each point $P_q$ is fed to the filter 11 which realizes the following transfer function:

$$\text{Filter } 11 = \frac{1}{2}(1 + z^{-2}) \quad (9)$$

The filter output $PM_q$ is applied to a window detector 12, in which a flatness threshold FT about 3 IRE units is set. The detector output DPH is then given by:

$$DPH_k = \begin{cases} 1 \text{ if } |PM_k - PM_{k+1}| < FT \\ 0 \text{ elsewhere.} \end{cases} \quad (10)$$

The image range detector 13 is used to separate pixels separated by noise. The binary detector output $NSAT_k$ is defined to be 1 if the pixel $P_k$ is within image range ($-20$, 120 IRE units).

An optional binary signal, said valid video $VV_i$ is used for by-passing, via gate 16a, transmitted data in the vertical blanking intervals of T.V. signals.

The detected characteristics $PN_k$, $DPH_k$, $NSAT_k$, $VV_k$ of the pixel $P_k$ are fed to an AND gate 16b. The gate output $DH_k$ is fed, in turn, to a logical filter 17, for deleting some isolated 1 of the sequence input $DH_k$. Precisely, the filter 17 is of order "r" if it lets a group of "r" or more consecutive 1 input pass through; a smaller group will be inhibited or deleted. The filter order "r"

is programmable from 0 to 7. A good compromise can be obtained if "r" equals to 3.

A supplementary protector circuit 18 is connected to the output of the logical filter circuit 17 to give a supplementary protection for detected genuine line. The groups of consecutive 1 in the sequence input will be enlarged in both sides (right and left) by some additional 1. The supplementary protection can be justified by many facts; the rise time and fall time of image edge, the transfer function of filter 11 (Equation 9), and the idea "no correction around image edge". An additional protection of eight pixels for each side is reasonable.

The binary signals $PN_m$ and $FHC_m$, possible noise and final horizontal contour are sent simultaneously in an inhibit circuit 20. In a similar manner to delayed detector 9, the inhibit circuit 20 can be described as follows:

Consider a window defined by the consecutive 1 of the sequence PN. If, within the window, the sequence signal FHC contains all 0, then at the end of the window (transition 10) the inhibit circuit output is decided to be a replica of the sequence PN. If not, the inhibit circuit output is set to be equal to 0 along the window.

The inhibit circuit 20 thus separates signal from possible noise.

Moreover, the two extremities of noisy segments are usually weak (below the detection threshold DT). It is desirable now to remove these remaining confetti and a supplementary correction circuit 21 is used for this purpose. A fixed supplementary correction of eight pixels for the left (beginning) and twenty-four pixels for the right (end) is adequate for practical electrical noise.

However, because of this additional correction, a delay circuit 22 and a by-pass circuit 23 are used, as shown in FIG. 1, for preventing noticeable false correction and for consistency with the idea "no correction around image edge".

The output of the signal verifier circuit 2 is the final decision signal, FINDEC, correction or not. The total delay from the time i of the noise detector circuit 1 inputs to the time n of the signal verifier 2 final decision output is about one video horizontal line delay.

Referring now to the noise corrector circuit 3 of the system, the line to be considered for correction is now line A. The input $A_i$ and its two vertical neighbours $AV_i$ and $P_i$ are fed simultaneously to the noise corrector circuit 3. Precisely, the inputs $AV_i$ and $P_i$ are sent individually to their respective composite video estimator circuits 25a, 25b and the input $A_i$ to delay circuit 26.

The composite video estimator 25a (or 25b) is simply a linear interpolation filter which is described by the following transfer function:

$$\text{Composite video estimator} = \tfrac{1}{2}(z^2 + z^{-2}) \tag{11}$$

Again, a delay circuit 26 is used for causality purpose or compatible timing. The outputs of the two estimator circuits 25a, 25b and that of delay circuit 26 are fed to the median filter circuit 27 (Ref. 3). The output, $MA_n$ of filter 27 and the output $A_n$ of the delay circuit 26, are sent simultaneously to a data selector circuit 28 which is governed by the final decision signal FINDEC from the signal verifier circuit 2.

The output $CORRA_n$ from the selector circuit 28 is described as follows:

$$CORRA_n = \begin{cases} MA_n \text{ if } FINDEC_n = 1 \text{ (correction)} \\ A_n \text{ if } FINDEC_n = 0 \text{ (no correction)} \end{cases} \tag{12}$$

Thus, only if a pixel is detected as noisy the system substitutes this pixel by a non-linear estimate from its vertical neighbours. The main reason for rising the median filter circuit 27 is for its edge preservation property (Ref. 3) especially for false detection.

Referring now to FIG. 2, there is shown the implementation of the delayed detector 9. The series-in parallel-out shift register 30 and parallel-in series out shift register 31 provides a double buffering is by using OR gates 32 as shown in the figure. The logic arrays circuit 33 is used for providing mainly two control signals CLEAR 34 and LOAD 35. The delayed detector circuit 9 functioning is illustrated in FIG. 2b.

FIG. 3 illustrates the structure of the inhibit circuit 20, its hardware implementation and functioning. The inhibit circuit 20 is a delayed decision circuit similar to delay detector 9 illustrated in FIG. 2 and it is therefore not necessary to repeat its operation. FIG. 3b illustrates the functioning of the inhibit circuit 20 of FIG. 3.

It is within the ambit of the present invention to cover any obvious modifications thereof, provided such modifications fall within the ambit of the appended claims.

We claim:

1. An electrical noise canceller system for television signals, said system comprising a noise detector circuit having three digital video delay line inputs representative of three video horizontal lines, said detector providing a binary output signal indicative of luminance calculation of pixel difference between said three inputs and having circuit means to determine if a selected one of said lines is noisy or not, a signal verifier circuit connected to said binary output signal to verify said binary output signal, said signal verifier generating an output signal indicative if a noise correction is required on said selected one of said lines, and a noise corrector circuit connected to said output signal of said signal verifier circuit and having circuit means to effect a substitution of a noisy line by a line which is a non-linear estimate of its immediate neighboring vertical video lines.

2. An electrical noise canceller system as claimed in claim 1 wherein said three digital video delay line inputs of said noise detector circuit comprises said selected video line and two adjacent video lines, each said video line being fed to a respective luminance filter for luminance calculation, a line template circuit at the output of each said luminance filters for line masking, a difference calculator fed by said line template circuits and having seven outputs to provide a second order vertical difference signal to a window detector circuit and six first order vertical difference signals to a quantizer and combiner circuit where six quantized differences are reduced to two binary output signals indicative of the pixel of the selected video line, and a delayed detector providing said binary output signal from said two binary output signals and a binary signal from the output of said window detector.

3. An electrical noise canceller system as claimed in claim 2 wherein said luminance filters realize a transfer function defined by a formula:

$$\tfrac{1}{2}[1 + \tfrac{1}{2}(z^2 + z^{-2})]$$

where $z^{-1}$ is the well-known pixel delay operator, said line template being described by a formula:

$$\tfrac{1}{2}[1+\tfrac{1}{2}(z+z^{-1})].$$

4. An electrical noise canceller system as claimed in claim 2 wherein a double difference threshold signal DDT is applied to said window detector circuit, said first order vertical difference signal being defined by a formula:

$$YTP_p - \tfrac{1}{2}(YTA_p + YTB_p)$$

where $YTP_p$ is the output signal of said line template circuit of said selected video line, $YTA_p$ and $YTB_p$ are the output signals of said line template circuits of a vertical neighbor of $YTP_p$, said binary output signal of said window detector being defined as:

$$DD_j = \begin{cases} 1 \text{ if } |YTP_j - \tfrac{1}{2}(YTA_j + YTB_j)| > DDT \\ 0 \text{ elsewhere.} \end{cases}$$

5. An electrical noise canceller system as claimed in claim 4 wherein a difference threshold signal DT is applied to said quantizer and combiner circuit, said two binary output signals of said quantizer and combiner circuit being calculated from the six differences between the signal of the selected line and said two adjacent vertical lines quantized to three discrete levels by said threshold signal DT and reduced to said two binary signals.

6. An electrical noise canceller system as claimed in claim 2 wherein said delayed detector has a predetermined window length to determine if said selected signal has noise or no noise from a comparison of the transitions of said inputs comprised of said two binary output signals of said quantizer and combiner and said binary signal from said window detector.

7. An electrical noise canceller system as claimed in claim 6 wherein said delayed detector comprises a series in-parallel out shift register circuit and a parallel in-series out shift register circuit.

8. An electrical noise canceller system as claimed in claim 1 wherein said signal verifier circuit comprises a filter, a flatness window detector, a logical filter, an inhibit circuit and a plurality of delay circuits for compatible timing of said system, said filter also being connected to said selected one of said digital video delay line inputs.

9. An electrical noise canceller system as claimed in claim 8 wherein said filter realizes a transfer function defined by $(\tfrac{1}{2})(1+z^{-2})$, said filter having an output connected to said flatness window detector having a flatness threshold signal FT fed thereto, said flatness window detector having an output defined by:

$$DPH_k = \begin{cases} 1 \text{ if } |PM_k - PM_{k+1}| < FT \\ 0 \text{ elsewhere} \end{cases}$$

and connected to an AND gate circuit, an image range detector connected to the input of said filter to separate pixels saturated by noise and feeding an output digital signal representative of the pixel being within an image range to said AND gate, an optional binary signal for by-passing transmitted data and also connected to said AND gate, said binary output signal of said noise detector also being connected to said AND gate, said AND gate having an output signal connected to said logical filter for deleting some isolated 1 bits of the sequence of 1 bits of said binary output signal.

10. An electrical noise canceller system as claimed in claim 9 wherein a supplementary protector circuit is connected to the output of said logical filter to provide protection in both sides of said output signal of said AND gate, said protector circuit having an output signal connected to said inhibit circuit which also receives said binary output signal from said noise detector output whereby to effect identification of a signal which is noisy, and a supplementary correction circuit connected to the output of said inhibit circuit to provide a fixed pixel correction of said inhibit circuit output signal which decides if said sampled video line requires correction.

11. An electrical noise canceller system as claimed in claim 1 wherein the combination of said noise detector circuit and said signal verifier circuit has a time delay of one horizontal video line.

12. An electrical noise canceller system as claimed in claim 11 wherein a fourth digital video delay line input is connected to said noise corrector circuit, said fourth line input being a time delay line of a third one of said delay line inputs of said noise detector circuit.

13. An electrical noise canceller system as claimed in claim 12 wherein said noise corrector circuit comprises a data selector circuit to which said output signal from said verifier is fed, a vertical median filter feeding a further input of said data selector circuit representative of immediate vertical neighboring video lines, and a delay circuit connected at an input thereof to a first one of said delayed digital video lines and having an output connected to a further input of said data selector, said data selector effecting said substitution of a noisy line.

14. An electrical noise canceller system as claimed in claim 13 wherein there is further provided two composite video estimator circuits connected to said vertical median filter, said video estimator circuits being fed a second and third one of said digital video line inputs that are immediate vertical neighbors of said first one of said delayed digital video line inputs, said video estimator circuits being linear interpolation filters having a transfer function defined by $(\tfrac{1}{2})(z^2+z^{-2})$.

15. An electrical noise canceller system as claimed in claim 14 wherein said data selector circuit is connected to said output signal from said verifier circuit, said data selector circuit being capable of substituting a non-linear estimate video line signal from its neighboring vertical video lines when said output signal identifies that said selected video line is noisy.

* * * * *

UNITED STATES PATENT AND TRADEMARK OFFICE
CERTIFICATE OF CORRECTION

PATENT NO. : 4,562,470

DATED : December 31, 1985

INVENTOR(S) : Chom T.L. Dinh, et al

It is certified that error appears in the above-identified patent and that said Letters Patent is hereby corrected as shown below:

On the title page assignee should read

-- (73) Assignee: Solutec Montreal, Canada --.

Signed and Sealed this

Twelfth Day of August 1986

[SEAL]

Attest:

DONALD J. QUIGG

Attesting Officer

Commissioner of Patents and Trademarks